United States Patent [19]

Chen

[11] Patent Number: 5,129,711

[45] Date of Patent: Jul. 14, 1992

[54] BICYCLE FREE-WHEEL

[76] Inventor: Kun-Ten Chen, No. 399, Min-Sheng Rd., Ta-Ya Hsiuang, Taichung Hsien, Taiwan

[21] Appl. No.: 747,585

[22] Filed: Aug. 20, 1991

[51] Int. Cl.$^5$ ............................................. F16D 7/06
[52] U.S. Cl. ................................. 301/105 B; 192/45; 192/48.92
[58] Field of Search ................... 301/105 B, 105 R; 192/45, 43, 43.2, 44, 48.92, 64

[56] References Cited

U.S. PATENT DOCUMENTS 4,145,095  3/1979  Segawa ...................... 301/105 B X
4,949,824  8/1990  Buckley et al. ............. 192/48.92 X Primary Examiner—Russell D. Stormer
Attorney, Agent, or Firm—Lowe, Price, LeBlanc & Becker

[57] ABSTRACT

A bicycle free-wheel includes a shaft, and a hub rotatably sleeved around the shaft. A driven member is rotatably sleeved around the shaft and fixed to the hub, and has an even outer face. A driving member is rotatably sleeved around the driven member and has an inner face confronting the outer face. A plurality of longitudinal projections of the inner face and the outer face define a plurality of elongated channels. The distance between the inner and outer faces of the elongated channel is gradually reduced from a wider end to a narrower end. A plurality of elastic rods are respectively received in the wider ends. A plurality of clutch rollers are respectively provided in the elongated channels. The clutch roller wedges into the narrower end allowing the driving member to rotate the driven member when the driving member is rotated in a first direction. The clutch roller moves toward the wider end to allow the driving member to be rotatable with respect to the driven member when the driving member is rotated in an opposite second direction.

3 Claims, 4 Drawing Sheets

BICYCLE FREE-WHEEL

BACKGROUND OF THE INVENTION

1. Field of the Invention

This invention relates to a free-wheel, more particularly to a bicycle free-wheel having an improved construction.

2. Description of the Related Art

A conventional bicycle free-wheel includes a shaft, and a tubular hub member which is rotatably sleeved around the shaft and has two ends. A substantially hollow cylindrical driven member is rotatably sleeved around the shaft and fixed to one of the two ends of the hub member. The driven member has an outer face. A substantially hollow cylindrical driving member is rotatably sleeved around the driven member and has an inner face confronting the outer face of the driven member. The outer face of the driven member has a plurality of spaced wedge-shaped recesses formed thereon between the outer face of the driven member and the inner face of the driving member. Each of the wedge-shaped recesses has a shallower part and a deeper part. A plurality of W-shaped spring plates are respectively provided in the deeper parts of the wedge-shaped recesses. A plurality of clutch rollers are respectively provided in the wedge-shaped recesses, each of which abuts on the W-shaped spring plate. Each of the clutch rollers moves into the deeper part and presses the W-shaped spring plate to allow the driving member to be rotatable with respect to the driven member when the driving member is rotated in a first direction. Each of the clutch rollers is biased by the W-shaped spring plate and wedges into the shallower part to allow the driving member to rotate the driven member when the driving member is rotated in a second direction opposite to the first direction.

The resiliency of the W-shaped spring plate applied on the clutch roller is not uniform. The movement of the clutch roller is irregular and the wear caused to the clutch roller is disuniform. Therefore, the effective service life of the clutch rollers rapidly ends.

SUMMARY OF THE INVENTION

Therefore, the objective of the invention is to provide a bicycle free-wheel having an improved construction which keeps clutch rollers moving properly so that the clutch rollers will not rapidly wear out.

Accordingly, a bicycle free-wheel of this invention includes a shaft, and a tubular hub member rotatably sleeved around the shaft and having two ends. A substantially hollow cylindrical driven member is rotatably sleeved around the shaft and fixed to one of the two ends of the hub member. The driven member has an even outer face. A substantially hollow cylindrical driving member is rotatably sleeved around the driven member and has an inner face confronting the outer face.

The inner face of the driving member has a plurality of longitudinal projections respectively and inwardly extending therefrom. The longitudinal projections of the inner face of the driving member and the outer face of the driven member define a plurality of elongated channels spaced therebetween. The distance between the inner face and the outer face of each of the elongated channels is gradually reduced from a wider end to a narrower end.

The bicycle free-wheel has a plurality of elastic rod members each of which is axially received in the wider end of one of the elongated channels and is fixed to the driving member and spaced from the driven member. The bicycle free-wheel further has a plurality of clutch rollers each of which is provided in one of the elongated channels and abuts on the elastic rod member. Each of the clutch rollers moves toward the wider end of the elongated channel and presses the elastic rod member to allow the driving member to be rotatable with respect to the driven member when the driving member is rotated in a first direction. Each of the clutch rollers is biased by the elastic rod member and wedges into the narrower end of the elongated channel to allow the driving member to rotate the driven member when the driving member is rotated in a second direction opposite to the first direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
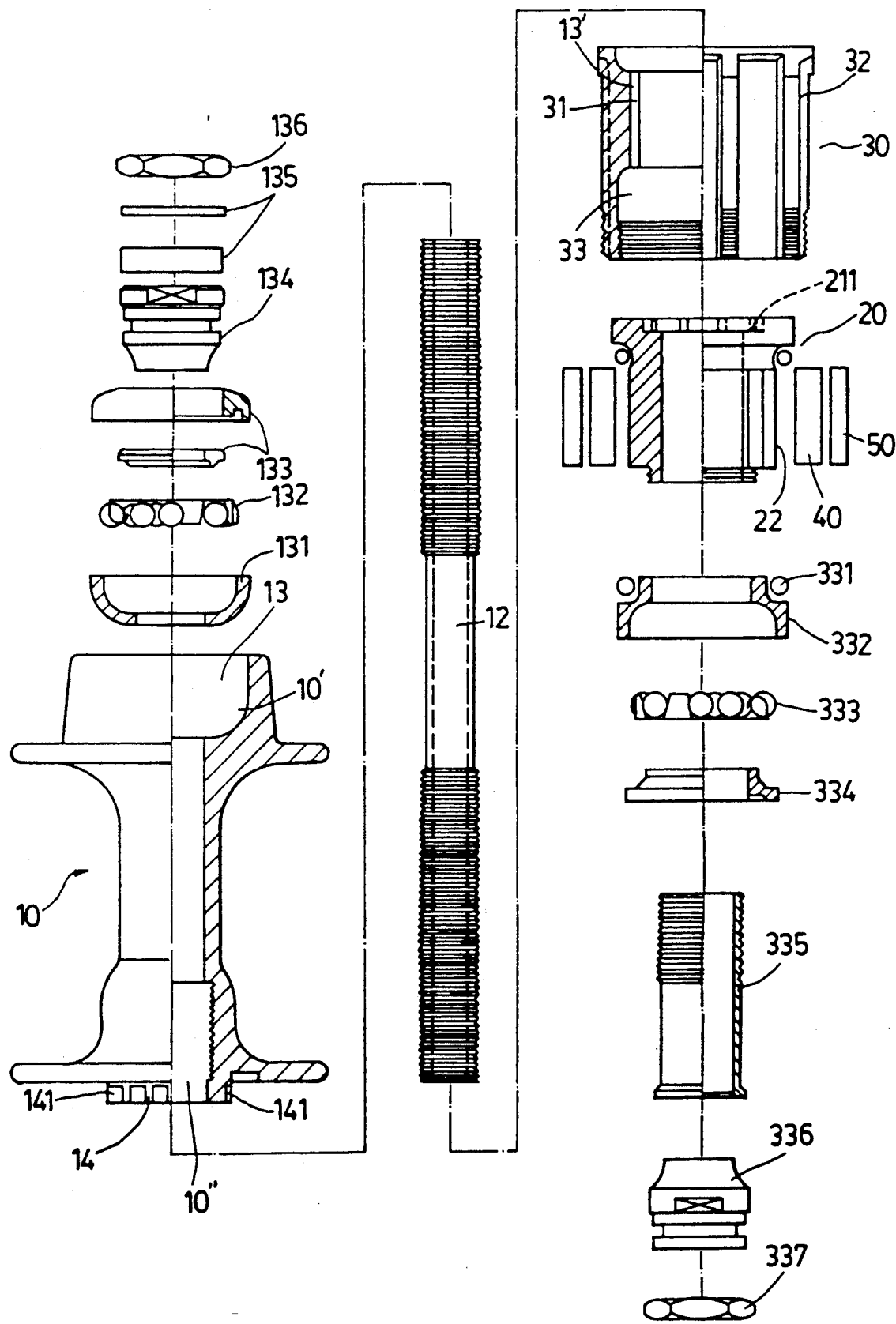
FIG. 1 is a schematic exploded view of the preferred embodiment of the bicycle free-wheel of this invention.
Figure 2:
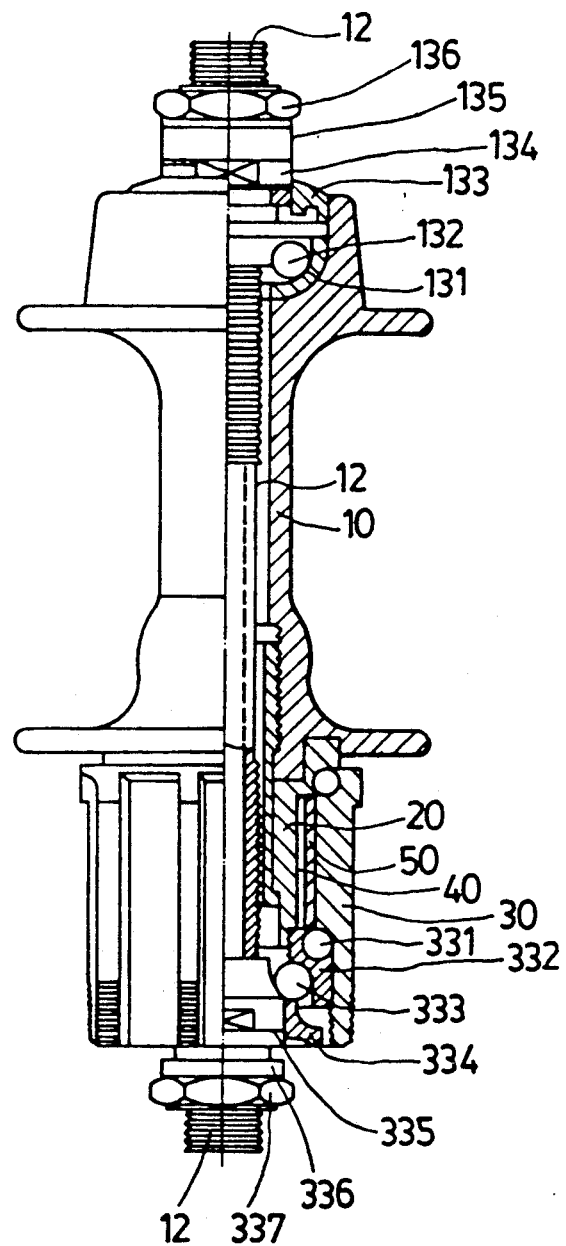
FIG. 2 is a schematic assembled view of the preferred embodiment.
Figure 3:
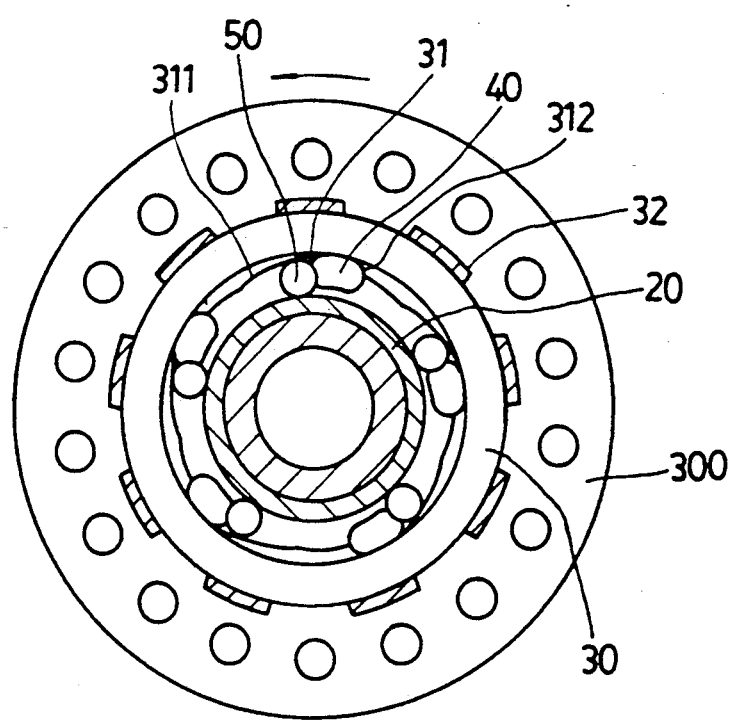
FIG. 3 is a sectional view of the preferred embodiment when the driving member is rotated in an anti-clockwise direction.

Referring to FIGS. 1-3, a free-wheel for a bicycle rear wheel includes a shaft (12), and a tubular hub member (10) rotatably sleeved around the shaft (12) and having a first and a second end (10', 10"). The first end (10') of the hub member (10) has a ball recess (13) formed thereon. A bearing assembly received in the ball recess (13) includes a ball casing (131), a ball seat with balls (132), a dust protector unit (133), a securing member (134), a washer unit (135), and a nut (136). The second end (10") of the hub member (10) includes a downwardly extending flange (14) having a plurality of recesses (141) formed thereon.

A substantially hollow cylindrical driven member (20) is rotatably sleeved around the shaft (12). The driven member (20) includes one end having a plurality of projections (211) respectively fixedly engaged with the recesses (141). The driven member (20) has an even outer face (22).

A substantially hollow cylindrical driving member (30) is rotatably sleeved around the driven member (20). The driving member (30) has an inner face (13') which confronts the outer face (22) and has a plurality of longitudinal projections respectively and inwardly extending therefrom. The driving member (30) has a recess (33) formed therein. A bearing assembly received in the recess (33) includes a ball casing (332) provided with balls (331), a ball seat (333) provided with balls, a first securing member (334), a threaded tube member (335), a second securing member (336), and a nut (337). The driving member (30) has an outer face having a plurality of toothed projections (32) formed thereon. A gear member (300) is provided around the driving member (30) and engages with the toothed projections (32).

The longitudinal projections of the inner face (13') of the driving member (30) and the outer face (22) of the driven member (20) define five elongated channels (31) spaced therebetween. The distance between the inner face (13') and the outer face (22) of each of the elongated channels (31) is gradually reduced from a wider end (312) to a narrower end (311).

The free-wheel includes five elastic rod members (40) each of which is axially received in the wider end (312) of the elongated channel (31) and is fixed to the driving member (30) and spaced from the driven member (20). Each of the elastic rod members (40) is made of an elastic plastic material and has an elliptical cross-section. The free-wheel further includes five clutch rollers (50) each of which is provided in one of the elongated channels (31) and abuts on the elastic rod member (40).

Figure 4:
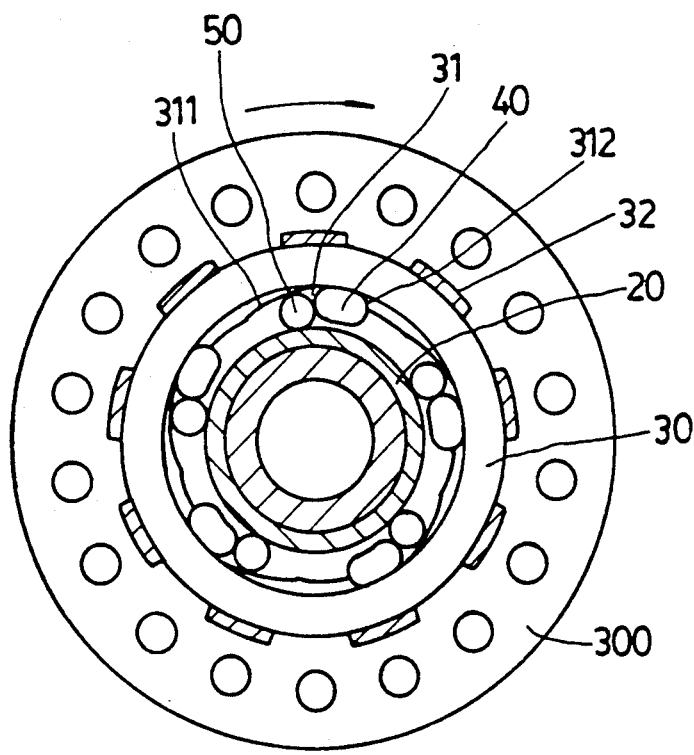
FIG. 4 is a sectional view of the preferred embodiment when the driving member is rotated in a clockwise direction.

When the user drives the bicycle and the driving member (30) is rotated in an anti-clockwise direction through the gear member (300), each of the clutch rollers (50) moves into the wider end (312) and presses the elastic rod member (40) to cause the driving member (30) to be rotatable with respect to the driven member (20). In this situation, the driving member (30) is idling. Referring to FIG. 4, when the user drives the bicycle and the driving member (30) is rotated in a clockwise direction through the gear member (300), the clutch roller (50) is biased by the elastic rod member (50) and wedges into the narrower end (311) causing the driving member (30) to rotate the driven member (20). The hub member (10) is rotated and the rear wheel (not shown) of the bicycle is simultaneously rotated.

The resilient force applied on the clutch roller (50) by the elastic rod member (40) is uniform, thereby the clutch roller (50) moving regularly and properly and the wear caused to the clutch roller (50) to be uniform and minimal. Therefore, the clutch roller (50) of this invention has a longer effective service life than the prior one.

While the present invention has been described in connection with what is considered the most practical and preferred embodiment, it is understood that this invention is not limited to the disclosed embodiment, but is intended to cover various arrangements included within the spirit and scope of the broadest interpretations and equivalent arrangements.

I claim:

1. a bicycle free-wheel comprising:

a shaft;

a tubular hub member rotatably sleeved around said shaft and having two ends;

a substantially hollow cylindrical driven member rotatably sleeved around said shaft and fixed to one of said two ends of said hub member, said driven member having an outer face; and a substantially hollow cylindrical driving member rotatably sleeved around said driven member and having an inner face confronting said outer face; characterized by:

said outer face of said driven member being an even face;

said inner face of said driving member having a plurality of longitudinal projections respectively and inwardly extending therefrom;

said longitudinal projections of said inner face of said driving member and said outer face of said driven member defining a plurality of elongated channels spaced therebetween,/ the distance between said inner face and said outer face of each of said elongated channels being gradually reduced from a wider end to a narrower end; and said bicycle free-wheel further comprising a plurality of elastic rod members each of which is axially received in said wider end of one of said elongated channels and is fixed to said driving member and spaced from said driven member and a plurality of clutch rollers each of which is provided in one of said elongated channels and abuts on said elastic rod member in said one of said elongated channels each of said clutch rollers moving toward said wider end of one of said elongated channels and presses said elastic rod member in said one of said elongated channels to allow said driving member to be rotatable with respect to said driven member when said driving member is rotated in a first direction,,;each of said clutch rollers being biased by said elastic rod member in one of said elongated channels and wedging into said narrower end of said one of said elongated channels to allow said driving member to rotate said driven member when said driving member is rotated in a second direction opposite to said first direction.

2. A bicycle free-wheel as claimed in claim 1, characterized in that each of said elastic rod members has a cylindrical cross-section.

3. A bicycle free-wheel as claimed in claim 1, characterized in that each of said elastic rod members has an elliptical cross-section.

* * * * *